Nov. 5, 1935.  F. A. SMITH  2,020,005
BRAKE LEVER
Filed May 3, 1933
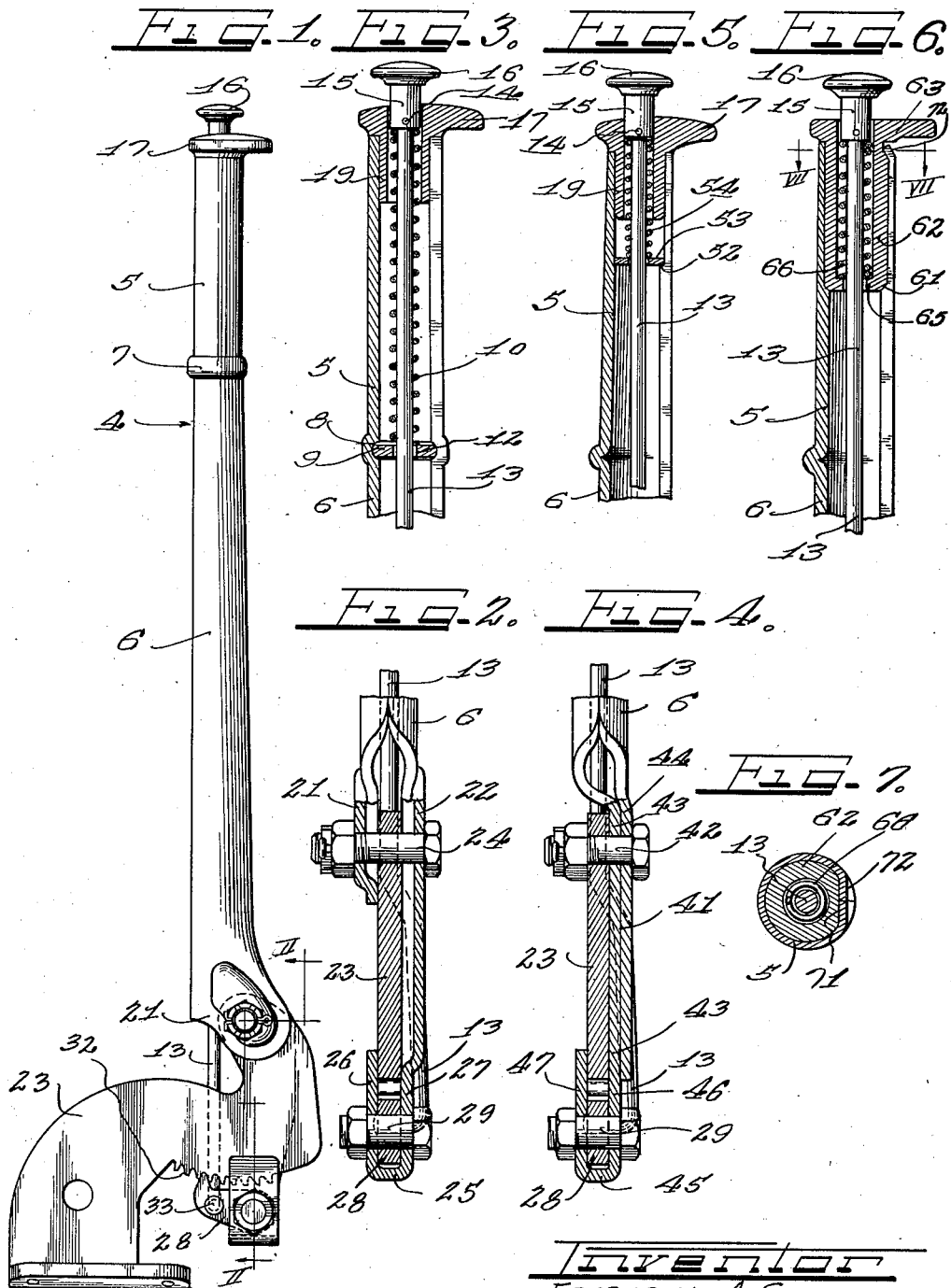
Inventor
FREDERICK A. SMITH.
by Charles...
Attys.

Patented Nov. 5, 1935

2,020,005

UNITED STATES PATENT OFFICE 2,020,005

BRAKE LEVER

Frederick A. Smith, North Chicago, Ill., assignor to Oakes Products Corporation, North Chicago, Ill., a corporation of Michigan Application May 3, 1933, Serial No. 669,098

5 Claims. (Cl. 74—538)

This invention relates to levers and will be described as incorporated in a lever of the general type employed in automotive vehicles for attachment to an emergency brake.

An object of this invention is the provision of a rugged brake lever formed of sheet material and which is economical in manufacture.

A further object is the provision of a simplified lever construction which is thoroughly dependable in operation and which substantially eliminates the necessity of service and repair.

Other objects and advantages of this invention will become apparent from the following detail description with reference to the accompanying drawing.

On the drawing:

Figure 1 is a side elevation of a brake lever incorporating my invention.

Figure 2 is a fragmentary view, somewhat enlarged, and illustrating parts in section and taken on substantially the line II—II of Figure 1.

Figure 3 is an enlarged fragmentary view of the upper end of the lever shown in Figure 1 and illustrating parts in section to better disclose the construction thereof.

Figure 4 is a partial sectional view similar to Figure 2 but illustrating a modified form of my invention.

Figures 5 and 6 are fragmentary sectional views similar to Figure 3, but illustrating modifications of my invention.

Figure 7 is a horizontal section taken on the line VII—VII of Figure 6.

As shown on the drawing:

The brake lever illustrated in Figures 1, 2 and 3 and designated as a whole by numeral 4 comprises a handle portion 5 and a body portion 6. An annular corrugation or ridge 7 is formed at the lower end of the handle portion, providing an annular depression 8 on the inside of the lever into which is permanently fitted a ring 9 forming a seat for the coil spring 10. The ring 9 is provided with a central opening 12 through which passes a pawl rod 13. The spring 10 is mounted on the pawl rod 13 and extends upwardly through the handle portion, the upper end being in engagement with the lower end of a depending portion 15 on an actuating button 16. The button 16 is suitably secured to the pawlrod 13 as by a pin 14.

A cap 17 is seated on the upper end of the handle portion and comprises a top portion which extends laterally beyond the side wall of the handle portion, and a substantially cylindrical depending skirt 19 tightly fitted within the upper end of the handle portion. The cap 17 is provided with a vertical bore into which the depending portion 15 of the actuating button 16 extends and by which the button is guided in its vertical reciprocation.

The lower end of the body portion 6 is provided with depending arms 21 and 22 which straddle the upper edge of a ratchet plate 23 and are pivoted thereto by a bolt 24. The arm 22 extends downwardly along one side of the plate 23 and has integrally formed therewith a U-shaped bracket 25 the sides 26 and 27 of which embrace the lower edge of the plate 23. Within the bracket 25 is pivotally mounted a pawl 28 by means of a bolt 29. The free end of the pawl 28 is engageable with the arcuately disposed series of teeth 32 on the lower edge of the ratchet plate 23. The pawl 28 is adapted to be actuated by the pawl rod 13 which is pivoted thereto as indicated at 33.

In the modification of my invention, shown in Figure 4, both side portions of the body 6 adjacent the lower end are pressed together and preferably welded or otherwise permanently secured in intimate engagement, together form a composite reinforced arm 41 pivoted to the plate 23 by a bolt 42 and passing downwardly along one side of the plate. In this construction, one of the side members 43 forming the composite plate, extends downwardly beyond the lower edge of the plate and is formed into a U-shaped bracket 45 having substantially parallel side portions 46 and 47 which embrace the lower edge of the plate and between which the pawl 28 is mounted by the bolt 29. The side portion 44 of the composite arm 41, preferably terminates at the lower edge of the plate 23.

In the modification of my invention, illustrated in Figure 5, the upper end of the handle portion 5 is counterbored to a somewhat increased diameter, providing an annular shoulder 52 upon which is seated a washer 53 to provide a seat for the coil spring 54 mounted on the pawl rod 13 for urging the same upwardly by pressure on the lower end of the actuating button 16. In the modification shown in Figures 6 and 7, the upper end of the handle portion is similarly counterbored to provide a shoulder 61 upon which is seated the lower end of a cylindrical skirt portion 62 forming a part of the cap 63. The skirt 62 is provided with an inwardly disposed annular flange 65 forming a seat for the coil spring 66 which engages the lower edge of the actuating button 16 for urging upwardly the pawl rod 13. In this construction, the skirt 62 of the cap 63 is provided with a recess 71 on one side adjacent the upper end and into which is deformed a portion of the upper end of the handle as indicated at 72 for the purpose of locking the cap 63 in position against both vertical and rotary movement relative to the handle portion.

From the foregoing description, it will be appreciated by those skilled in the art that this invention is susceptible of various forms and modifications without departing from the principle thereof, and accordingly, I desire that the patent to be granted hereon shall not be restricted in any manner except as necessitated by the prior art.

I claim as my invention:

1. In a device of the class described, a vertically disposed ratchet plate, said plate being adapted for rigid attachment to a support, said plate having an opening therethrough adjacent its upper edge and including ratchet teeth on its lower edge, a lever comprising depending arms pivotally connected to said plate adjacent its upper edge, one of said arms extending downwardly beyond the lower ends of said teeth and comprising a reversely extending end portion defining a bracket embracing the lower edge of the plate, a pawl engageable with said teeth and pivotally disposed in said bracket, and means for actuating said pawl.

2. In a device of the class described, a vertically disposed ratchet plate, said plate being adapted for rigid attachment to a support, said plate having an opening therethrough adjacent its upper edge and including ratchet teeth on its lower edge, a lever comprising depending arms pivotally connected to said plate adjacent its upper edge, said arms being spaced apart and embracing the upper edge of said plate at the place of pivotal connection thereto, one of said arms extending downwardly beyond the lower ends of said teeth and comprising a reversely extending end portion defining a bracket embracing the lower edge of the plate, a pawl engageable with said teeth and pivotally disposed in said bracket, and means for actuating said pawl.

3. In a device of the class described, a vertically disposed ratchet plate, said plate being adapted for rigid attachment to a support, said plate having an opening therethrough adjacent its upper edge and including ratchet teeth on its lower edge, a lever comprising depending arms pivotally connected to said plate adjacent its upper edge, said arms being rigidly secured in engagement with each other and extending downwardly along one side of said plate, one of said arms extending beyond the lower edge of said plate and comprising a reversely extending end portion defining a bracket embracing the lower edge of the plate, and a pawl engageable with said teeth and pivotally disposed in said bracket.

4. In a device of the class described, a vertically disposed plate adapted for rigid attachment to a support, arcuately arranged depending ratchet teeth on the lower edge of said plate, a hollow sheet metal lever having the opposite sides of the lower end portion disposed in intimate engagement with each other forming a reinforced depending arm, said arm being pivotally secured on said plate adjacent the upper edge thereof, an upwardly disposed U-shaped bracket on said arm adapted to embrace said teeth and a pawl engageable with said teeth and pivotally disposed between the sides of said bracket.

5. In a device of the class described, a vertically disposed plate adapted for rigid attachment to a support, a hollow sheet metal lever having the opposite sides of the lower end portion disposed and permanently secured in intimate engagement with each other forming a reinforced depending arm, said arm being pivotally secured on said plate adjacent the upper edge thereof, an upwardly disposed bracket on said arm adapted to embrace a part of the lower edge of said plate, and locking means mounted in said bracket and engageable with said plate for releasably and selectively holding said lever relative to said plate in a plurality of positions.

FREDERICK A. SMITH.